(12) United States Patent
Yoon et al.

(10) Patent No.: US 11,869,721 B2
(45) Date of Patent: Jan. 9, 2024

(54) DIELECTRIC CERAMIC COMPOSITION AND CAPACITOR COMPONENT

(71) Applicant: SAMSUNG ELECTRO-MECHANICS CO., LTD., Suwon-si (KR)

(72) Inventors: Seok Hyun Yoon, Suwon-si (KR); Joo Hee Lee, Suwon-si (KR); In Ho Jeon, Suwon-si (KR); Song Je Jeon, Suwon-si (KR); Jin Woo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 211 days.

(21) Appl. No.: 17/505,339

(22) Filed: Oct. 19, 2021

(65) Prior Publication Data
US 2023/0041011 A1 Feb. 9, 2023

(30) Foreign Application Priority Data
Jul. 26, 2021 (KR) .................. 10-2021-0097781

(51) Int. Cl.
*H01G 4/12* (2006.01)
*C04B 35/468* (2006.01)
*H01G 4/30* (2006.01)

(52) U.S. Cl.
CPC ....... *H01G 4/1227* (2013.01); *C04B 35/4682* (2013.01); *H01G 4/30* (2013.01);
(Continued)

(58) Field of Classification Search
CPC ...... H01G 4/1227; H01G 4/30; H01G 4/1209; H01G 4/012; C04B 35/4682;
(Continued)

(56) References Cited

U.S. PATENT DOCUMENTS

| 2016/0155570 A1* | 6/2016 | Shimada ............... C04B 35/634 29/25.42 |
| 2016/0194248 A1* | 7/2016 | Yoon ..................... H01G 4/1227 501/137 |

(Continued)

FOREIGN PATENT DOCUMENTS

| JP | 2019131438 A * 8/2019 ........... C01G 23/006 |
| KR | 10-2016-0084193 A 7/2016 |

(Continued)

OTHER PUBLICATIONS

Seok-Hyun Yoon, et al., "Influence of Grain Size on Impedance Spectra and Resistance Degradation Behavior in Acceptor (Mg)-Doped BaTiO3 Ceramics," J. Am. Ceram. Soc., No. 9, vol. 12, 2009, pp. 2944-2952.

(Continued)

*Primary Examiner* — Dion R. Ferguson
(74) *Attorney, Agent, or Firm* — Morgan, Lewis & Bockius LLP

(57) ABSTRACT

A capacitor component includes: a body including a dielectric layer and an internal electrode layer; and an external electrode disposed on the body, and connected to the internal electrode layer. A surface color of the body is R≤30, G≤30, B≤40 based on R/G/B, and a dielectric constant of the dielectric layer is 2000 or more and 4000 or less.

20 Claims, 2 Drawing Sheets

(52) U.S. Cl.
CPC ............ *C04B 2235/3224* (2013.01); *C04B 2235/3236* (2013.01); *C04B 2235/3239* (2013.01); *C04B 2235/3267* (2013.01); *C04B 2235/3418* (2013.01); *C04B 2235/442* (2013.01)

(58) Field of Classification Search
CPC .... C04B 2235/3224; C04B 2235/3236; C04B 2235/3239; C04B 2235/3267; C04B 2235/3418; C04B 2235/442; C04B 35/49; C04B 2235/3208; C04B 2235/3215; C04B 2235/3225; C04B 2235/3227; C04B 2235/3229; C04B 2235/3241; C04B 2235/3275; C04B 2235/3281; C04B 2235/3272; C04B 2235/3279; C04B 2235/3284; C04B 2235/5445; C04B 2235/652; C04B 2235/6582; C04B 2235/663; C04B 2235/768
See application file for complete search history.

(56) References Cited

U.S. PATENT DOCUMENTS

| | | | | |
|---|---|---|---|---|
| 2017/0186543 | A1* | 6/2017 | Park | H01G 4/1209 |
| 2017/0190626 | A1* | 7/2017 | Yoon | H01G 4/1227 |
| 2019/0100465 | A1* | 4/2019 | Yoon | B32B 18/00 |
| 2020/0251242 | A1* | 8/2020 | Kwon | C04B 35/4682 |
| 2020/0303125 | A1* | 9/2020 | Tsuru | B32B 18/00 |
| 2020/0395174 | A1* | 12/2020 | Kim | H01G 4/248 |
| 2020/0411239 | A1* | 12/2020 | Yoon | C04B 35/4682 |
| 2021/0027944 | A1* | 1/2021 | Park | C04B 35/4682 |
| 2021/0057156 | A1* | 2/2021 | Seo | H01G 4/1209 |
| 2021/0383975 | A1* | 12/2021 | Yoon | H01G 4/30 |
| 2023/0041011 | A1* | 2/2023 | Yoon | C04B 35/4682 |

FOREIGN PATENT DOCUMENTS

| | | | | |
|---|---|---|---|---|
| KR | 10-2017-0081861 A | | 7/2017 | |
| KR | 2019124632 A | * | 11/2019 | ........... C04B 35/465 |
| WO | WO-2010100827 A1 | * | 9/2010 | ........... C04B 35/465 |

OTHER PUBLICATIONS

K. Hong, et al., "Materials for optical, magnetic and electronic devices," Journal of Materials Chemistry C, No. 7, vol. 32, 2019, pp. 9782-9802.

Seok-Hyun Yoon, et al., "Effect of Acceptor (Mg) Concentration on the Resistance Degradation Behavior in Acceptor (Mg)-Doped BaTiO3 Bulk Ceramic: I. Impedance Analysis," J. Am. Ceram. Soc., No. 92, vol. 8, 2009, pp. 1758-1765.

Seok Hyun Yoon, et al., "Effect of Acceptors on the Segregation of Donors in Niobium-Doped Barium Titanate Positive Temperature Coefficient Resistors," J. Am. Ceram. Soc., No. 83, vol. 10, 2000, pp. 2463-2472.

Seok-Hyun Yoon, "Electrically Active and Inactive Single Grain Boundaries in Semiconducting BaTiO3," J. Am. Ceram. Soc., No. 98, vol. 10, 2015, pp. 3243-3249.

* cited by examiner

DIELECTRIC CERAMIC COMPOSITION AND CAPACITOR COMPONENT

CROSS-REFERENCE TO RELATED APPLICATION(S)

This application claims benefit of priority to Korean Patent Application No. 10-2021-0097781 filed on Jul. 26, 2021 in the Korean Intellectual Property Office, the disclosure of which is incorporated herein by reference in its entirety.

TECHNICAL FIELD

The present disclosure relates to a dielectric ceramic composition and a capacitor component.

BACKGROUND

A multilayer ceramic capacitor (MLCC), a capacitor component, is an important chip component used in areas such as the communications, information technology, home appliance, automobile, and other industries, due to advantages thereof such as a small size, high capacitance, and ease of mounting, and in particular, is a core passive element used in various electric, electronic and information communication devices such as mobile phones, computers, digital TVs, and the like.

A current dielectric layer of MLCC of a base metal electrode (BME) having high capacitance such as X5R, X7R, X8R, Y5V, and the like, includes a fixed valence acceptor element added to a $BaTiO_3$-series base material main component, a rare earth element serving as a donor, a valence variable acceptor elements, and the like, and is based on a material to which a sintering aid, or the like is additionally added.

Meanwhile, when a dielectric ceramic material in which an amount of an added donor is greater than an amount of an acceptor added to a $BaTiO_3$-series base material, or a dielectric ceramic material to which no acceptor is added, is sintered at a reducing atmosphere, a specimen has a reduced color such as dark blue, black, or the like, and exhibits semiconductivity characteristics in which a resistance value is rapidly lowered.

SUMMARY

An aspect of the present disclosure is to provide a dielectric ceramic composition and a capacitor component satisfying X7R or X7S temperature characteristics even when sintered under reducing atmosphere conditions to which a BME internal electrode layer may be applied.

Another aspect of the present disclosure is to provide a dielectric ceramic composition and capacitor component improving reliability even when sintered under reducing atmosphere conditions to which a BME internal electrode layer can be applied.

According to an aspect of the present disclosure, a capacitor component, includes: a body including a dielectric layer and an internal electrode layer; and an external electrode disposed on the body, and connected to the internal electrode layer. A surface color of the body is R≤30, G≤30, B≤40 based on R/G/B. A dielectric constant of the dielectric layer is 2000 or more and 4000 or less.

According to another aspect of the present disclosure, a dielectric ceramic composition, includes: a barium titanate-based base material main component and a subcomponent. The subcomponent includes a first subcomponent including at least one of oxides and carbonates of variable valence acceptor elements including at least one of Mn, V, Cr, Fe, Ni, Co, Cu, and Zn; and a second subcomponent including at least at least one of oxides and carbonates of rare earth elements including at least one of Y, Dy, Ho, Er, Gd, Ce, Nd, Sm, Tb, Tm, La, Gd and Yb. The first subcomponent includes Mn and V, and the second subcomponent includes Dy.

According to another aspect of the present disclosure, a dielectric ceramic composition includes: a barium titanate-based base material main component and a subcomponent. The subcomponent comprises a first subcomponent including at least one of oxides and carbonates of variable valence acceptor elements including at least one of Mn and V; a second subcomponent including at least one of oxides and carbonates of Dy; a third subcomponent including at least one selected from a group consisting of oxides and carbonates of at least one of Ba and Ca; and a fourth subcomponent including at least one selected from a group consisting of oxides and carbonates of Si. A sum of Mn and V is 0.15 mole or more and 1.02 mole or less per 100 mole of the base material main component. Dy is 1.5 mole or more and 4.0 mole or less per 100 mole of the main component of the base material. A sum of Ba and Ca is 0.72 mole or more and 4.32 mole or less per 100 mole of the base material main component. Si is 0.5 mole or more and 3.0 mole or less per 100 mole of the base material main component.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
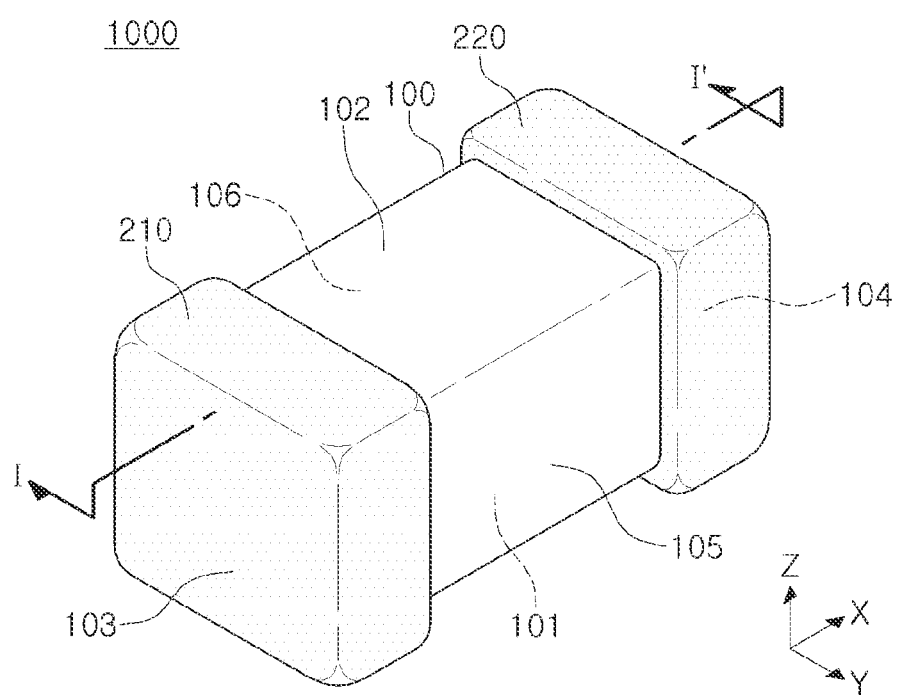
FIG. 1 is a perspective view schematically illustrating a capacitor component according to an embodiment of the present disclosure.

Hereinafter, embodiments of the present disclosure will be described as follows with reference to the attached drawings. The terms used in the exemplary embodiments are used to simply describe an exemplary embodiment, and are not intended to limit the present disclosure. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term "disposed on," "positioned on," and the like, may indicate that an element is positioned on or beneath an object, and does not necessarily mean that the element is positioned on the object with reference to a gravity direction.

The term "coupled to," "combined to," and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

In the descriptions described with reference to the accompanying drawings, the same elements or elements corresponding to each other will be described using the same reference numerals, and overlapping descriptions will not be repeated.

A dielectric ceramic composition according to an embodiment of the present disclosure includes a base material main component and subcomponents, and the base material main component is a barium titanate-based compound including Ba.

The dielectric ceramic composition according to an embodiment of the present disclosure may satisfy X7R (−55° C. to 125° C.) or X7S (−55° C. to 125° C.) characteristics specified in the Electronic Industries Association (EIA) standards.

According to an embodiment of the present disclosure, a donor doped-type dielectric ceramic composition capable of securing reliability is provided. The dielectric ceramic composition is sintered in a reducing atmosphere in which nickel (Ni) is not oxidized at 1300É or less by using nickel (Ni) as an internal electrode, and in the dielectric ceramic composition, a surface color of a specimen satisfies R≤30, G≤30, B≤40 with respect to R/G/B values is satisfied, and a dielectric constant thereof satisfies 2000 or more and 4000 or less.

Figures 3A, 3B:
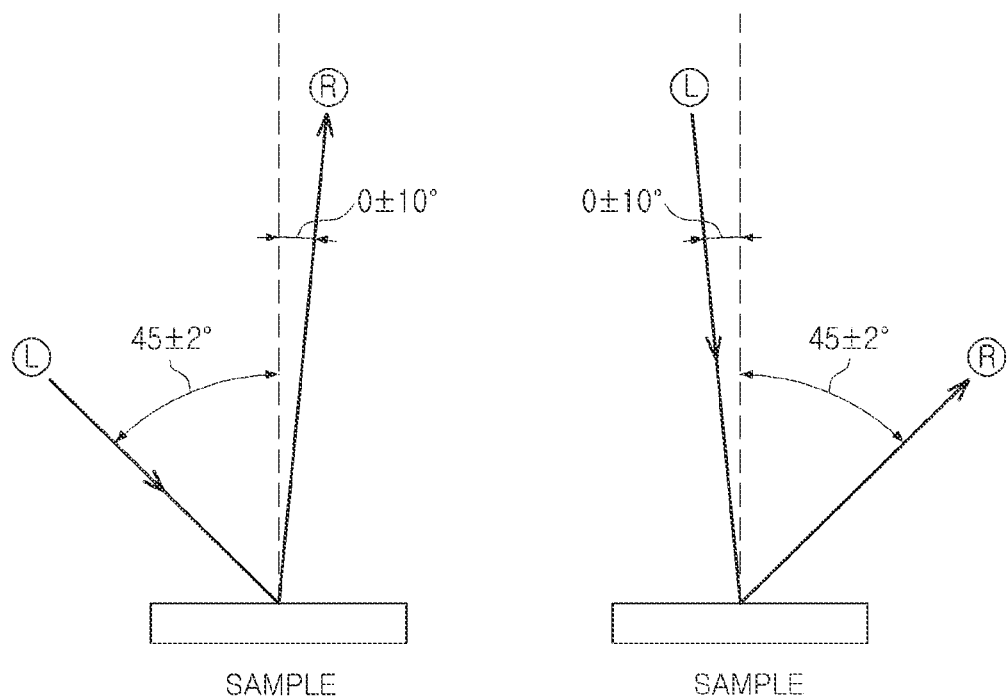
FIG. 3A and FIG. 3B are diagrams schematically illustrating conditions (a) and (b) among four conditions related to geometric conditions of irradiated light and received light of a reflective object, stipulated in JIS Z 8722.

Meanwhile, in the present specification, the R, G, and B values of the surface color of a specimen or a body, may mean a numerical value measured by disposing the specimen or a component (or a body of the component) in a color cabinet using a standard light source, and capturing an image thereof with a spectrophotometer or digital camera, and quantitatively using an online image color picker (https://pinetools.com/image-color-picker) website. Here, the standard light source used for color measurement may be a standard light source D65 (fluorescent lamp standard F7) specified by the World Lighting Organization (CIE) or JIS. In addition, geometrical conditions for a light source and a light receiver may be according to conditions respectively shown in FIGS. 3A and 3B among four conditions related to the geometric conditions of irradiated light and received light of a reflective object, stipulated in JIS Z 8722.

In addition, an aspect of the present disclosure is to provide a dielectric material formed by sintering the dielectric ceramic composition and a multilayer ceramic capacitor using the dielectric ceramic composition.

The multilayer ceramic capacitor according to an embodiment of the present disclosure may satisfy the above-described temperature characteristics and implement excellent reliability.

Hereinafter, each component of the dielectric ceramic composition according to an embodiment of the present disclosure will be described in more detail.

a) Base Material Main Component

A dielectric ceramic composition according to an embodiment of the present disclosure may include a base material main component including Ba and Ti.

According to an embodiment of the present disclosure, the base material main component may include at least one selected from a group consisting of $BaTiO_3$, $(Ba_{1-x}Ca_x)$ $(Ti_{1-y}Ca_y) O_3$ (where x is 0≤x≤0.3, y is 0≤y≤0.1), $(Ba_{1-x}Ca_x)$ $(Ti_{1-y}Zr_y) O_3$ (where x is 0≤x≤0.3, y is 0≤y≤0.5), and $Ba(Ti_{1-y}Zr_y)O_3$ (where 0<y≤0.5), but is not limited thereto, and a solid solution base material modified from barium titanate may be used.

An average particle diameter of the base material main component powder is not particularly limited, but may be 300 nm or less.

b) First Subcomponent

According to an embodiment of the present disclosure, the dielectric ceramic composition may include a variable valence acceptor element including at least one of Mn, V, Cr, Fe, Ni, Co, Cu and Zn, and at least one of oxides and carbonates thereof, as the first subcomponent. The first subcomponent may essentially include Mn and V.

The first subcomponent may be included in a range of 0.15 mole or more and 1.02 mole or less with respect to 100 mole of the base material main component.

A content of the first subcomponent is based on a content of at least one of Mn, V, Cr, Fe, Ni, Co, Cu, and Zn included in the first subcomponent without distinguishing an additive form such as an oxide or a carbonate.

For example, a sum of the contents of at least one or more variable valence acceptor elements among Mn, V, Cr, Fe, Ni, Co, Cu, and Zn included in the first subcomponent may be 0.15 mole or more and 1.02 mole or less with respect to 100 mole of the base material main component.

The content of the first subcomponent and the contents of the second to fifth subcomponents to be described later are relative amounts with respect to 100 mole of the base material main component, and in particular, may be defined as mole of metal or metalloid (Si) included in each subcomponent. The mole of the metal or metalloid may include mole of the metal or metalloid in an ionic state.

When the content of the first subcomponent is 0.15 mole or more and 1.02 mole or less with respect to 100 mole of the base material main component, a dielectric ceramic composition having good reliability can be provided. In the dielectric ceramic composition, reduction resistance characteristics may be realized, a surface color condition of a specimen is satisfied, a dielectric constant condition is 2000 or more and 4000 or less, X7R (−55° C. to 125° C.), or X7S (−55° C. to 125° C.) characteristics are satisfied, an RC value is secured.

When the content of the first subcomponent is less than 0.15 mole with respect to 100 mole of the base material main component, a dielectric constant exceeds 4000, and Mean Time To Failure (MTTF) of a highly accelerated life time test may be lowered to be less than 100 hours, thereby reducing reliability.

When the content of the first subcomponent exceeds 1.02 mole with respect to 100 mole of the base material main component, a surface color condition of a specimen may not be satisfied, and the MTTF of the highly accelerated life time test may be lowered to less than 100 hours, thereby reducing reliability.

b) Second Subcomponent

According to an embodiment of the present disclosure, the dielectric ceramic composition may include a second subcomponent including at least one of oxides and carbonates of at least one rare earth element selected from a group consisting of Y, Dy, Ho, Er, Gd, Ce, Nd, Sm, Tb, Tm, La, Gd, and Yb. The second subcomponent may essentially include Dy.

The second subcomponent may be included in an amount of 1.5 mole or more and 4.0 mole or less with respect to 100 mole of the base material main component.

A content of the second subcomponent may be based on a content of at least one rare earth element selected from a group consisting of Y, Dy, Ho, Er, Gd, Ce, Nd, Sm, Tb, Tm, La, Gd, and Yb included in a third subcomponent without distinguishing an additive form such as an oxide or a carbonate.

For example, a sum of at least one rare earth element selected from a group consisting of Y, Dy, Ho, Er, Gd, Ce, Nd, Sm, Tb, Tm, La, Gd and Yb included in the second subcomponent may be 1.5 mole or more and 4.0 mole or less with respect to 100 mole of the base material main component.

When the content of the second subcomponent is 1.5 mole or more and 4.0 mole or less with respect to 100 mole of the base material main component, a dielectric ceramic composition having good reliability may be provided. In the dielectric ceramic composition, reduction resistance characteristics may be realized, a surface color condition of a specimen may be satisfied, a dielectric constant condition may be 2000 or more and 4000 or less, and X7R (−55° C. to 125° C.), or X7S (−55° C. to 125° C.) characteristics may be satisfied, an RC value is secured.

When the content of the second subcomponent is less than 1.5 mole based on 100 mole of the base material main component, a dielectric constant exceeds 4000 and MTTF of a highly accelerated life time test is lowered to less than 100 hours, thereby reducing reliability.

When the content of the second subcomponent exceeds 4.0 mole with respect to 100 mole of the base material main component, the dielectric constant is less than 2000, and the MTTF of the highly accelerated life time test is lowered to less than 100 hours, thereby reducing reliability.

c) Third Subcomponent

According to an embodiment of the present disclosure, the dielectric ceramic composition may include a third subcomponent including at least one selected from a group consisting of oxides and carbonates of at least one element of Ba and Ca.

The third subcomponent may be included in a range of 0.72 mole or more and 4.32 mole or less with respect to 100 mole of the base material main component.

A content of the third subcomponent may be based on a content of at least one of Ba and Ca included in the third subcomponent without distinguishing an additive form such as an oxide or a carbonate.

For example, a sum of at least one element of Ba and Ca included in the third subcomponent may be 0.72 mole or more and 4.32 mole or less with respect to 100 mole of the base material main component.

When the third subcomponent is included in a range of 0.72 or more and 4.32 mole or less with respect to 100 mole of the base material main component, a dielectric constant and high-temperature withstand voltage characteristics may be improved. When the concentration of the third subcomponent does not belong to this range, the densification of sintered dielectrics is not sufficient or TCC (Temperature Coefficient of Capacitance) cannot satisfy X7S specification.

d) Fourth Subcomponent

According to an embodiment of the present disclosure, the dielectric ceramic composition may include a fourth subcomponent including at least one selected from a group consisting of an oxide of a Si element, a carbonate of a Si element, and glass containing the Si element.

The fourth subcomponent may be included in a range of 0.5 mole or more and 3.0 mole or less, with respect to 100 mole of the base material main component.

A content of the fourth subcomponent may be based on a content of the Si element included in the fourth subcomponent, without distinguishing an additive form such as glass, oxides, or carbonates.

When the content of the fourth subcomponent is less than 0.5 mole with respect to 100 mole of the main component of the dielectric base material, since density of a specimen is low, a surface color condition of the specimen is not satisfied, a dielectric constant is less than 2000, and MTTF of a highly accelerated life time test is lowered to be less than 100 hours, thereby reducing reliability.

When the content of the fourth subcomponent exceeds 3.0 mole with respect to 100 mole of the main component of the dielectric base material, the dielectric constant becomes less than 2000 and the MTTF of the highly accelerated life time test is lowered to less than 100 hours, thereby reducing reliability.

Meanwhile, a ratio of the sum of at least one of Ba and Ca of the third subcomponent to the sum of the Si elements of the fourth subcomponent may be 1.20 or more and 2.00 or less. When the ratio thereof is less than 1.20, the dielectric constant exceeds 4000, the MTTF of the highly accelerated life time test is lowered to less than 100 hours, thereby reducing reliability. When the ratio thereof exceeds 2.00, the surface color condition of the specimen is not satisfied, the dielectric constant becomes less than 2000, and the MTTF of the highly accelerated life time test is lowered to less than 100 hours, thereby reducing reliability.

e) Fifth Subcomponent

According to an embodiment of the present disclosure, the dielectric ceramic composition may include, as a fifth subcomponent, at least one of oxides and carbonates of a fixed-valence acceptor element including Mg.

The fifth subcomponent may be included in a range of 0.27 mole or less with respect to 100 mole of the base material main component.

A content of the fifth subcomponent may be based on a content of an Mg element included in the fifth subcomponent without distinguishing an additive form such as an oxide or a carbonate.

For example, a content of the Mg element included in the fifth subcomponent may be 0.27 mole or less based on 100 mole of the base material main component.

When the content of the fifth subcomponent exceeds 0.27 mole with respect to 100 mole of the dielectric base material main component, a surface color condition of a specimen is not satisfied, and MTTF of the highly accelerated life time test is lowered to be less than 100 hours, thereby reducing reliability.

Meanwhile, a ratio of the sum of rare earth elements of the second subcomponent to the total of Mg of the fifth subcomponent may be 15 or more. When the ratio thereof is less than 15, the surface color condition of the specimen may not be satisfied, and the MTTF of the highly accelerated life time test may be lowered to be less than 100 hours, thereby reducing reliability.

Figure 2:
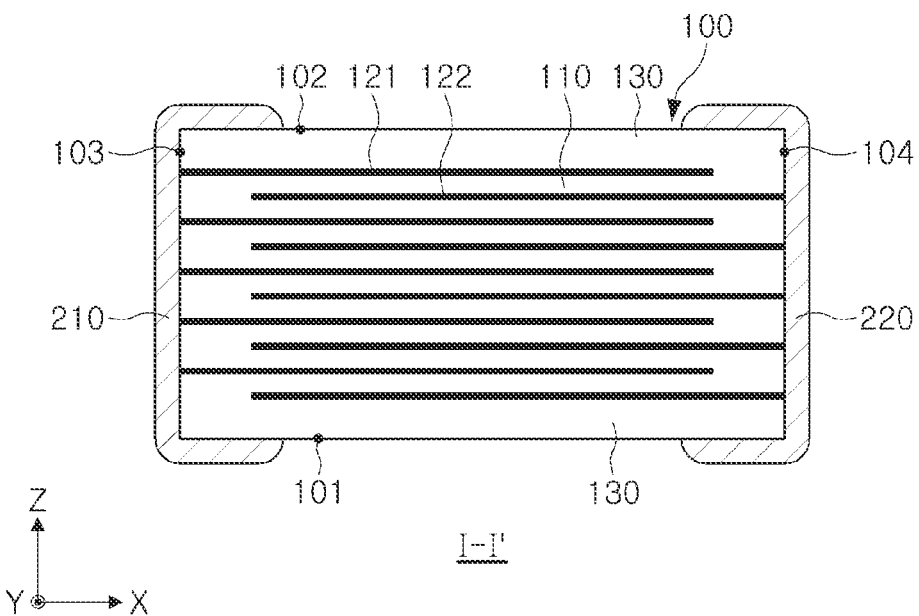
FIG. 2 is a diagram schematically illustrating a cross-sectional view taken along line I-I' of FIG. 1.

FIG. 1 is a perspective view schematically illustrating of a capacitor component according to an embodiment of the present disclosure, and FIG. 2 is a diagram schematically illustrating a cross-sectional view taken along line I-I' of FIG. 1.

Referring to FIGS. 1 and 2, a capacitor component 1000 according to the present embodiment includes a body 100 having external electrodes 210 and 220. The body 100 includes a dielectric layer 110 and internal electrode layers 121 and 122.

The body 100 forms an exterior of the capacitor component 1000 according to the present embodiment. The specific shape of the body 110 is not particularly limited, but as illustrated, the body 110 may have a hexahedral or similar shape. Due to sintering shrinkage occurring during a sintering process, the body 100 may have a substantially hexahedral shape although without perfectly straight lines within the hexahedral shape.

Based on FIGS. 1 and 2, the body 100 includes a first surface 101 and a second surface 102 facing each other in a thickness (Z) direction, a third surface 103 and a fourth surface 104 facing each other in a longitudinal (X) direction, and a fifth surface 105 and a sixth surface 106 facing each other in a width (Y) direction. Each of the third to sixth surfaces 103, 104, 105, and 106 of the body 100 corresponds to a wall surface of the body 100 connecting the first surface 101 and the second surface 102 of the body 100. Hereinafter, both end surfaces (one end surface and the other end surface) of the body 100 may mean the third surface 103 and the fourth surface 104 of the body, and both side surfaces (one side surface and the other side surface) of the body 100 may mean the fifth surface 105 and the sixth surface 106 of the body 100. In addition, one surface and the other surface of the body 100 may mean the first surface 101 and the second surface 102 of the body 100, respectively. One surface 101 of the body 100 may be used as a mounting surface when the capacitor component 1000 according to the present embodiment is mounted on a mounting substrate such as a printed circuit board, or the like.

The body 100 includes a dielectric layer 110 and first and second internal electrode layers 121 and 122 alternately disposed with the dielectric layer 110 interposed therebetween. Each of the dielectric layer 110, the first internal electrode layer 121, and the second internal electrode layer 122 is formed of a plurality of layers. Hereinafter, the first and second internal electrode layers 121 and 122 will be collectively referred to as internal electrode layers 121 and 122, except for a case in which it is necessary to distinguish therebetween. Accordingly, the description of a portion collectively referred to as the internal electrode layers 121 and 122 may be commonly applied to the first and second internal electrode layers 121 and 122.

A plurality of dielectric layers 110 forming the body 100 are in a sintered state, and boundaries between adjacent dielectric layers 110 may be integrated to such an extent that they may be difficult to determine without using a scanning electron microscope (SEM).

A raw material for forming the dielectric layer 110 is not particularly limited as long as sufficient capacitance can be obtained therewith. For example, the dielectric layer 110 may be formed by sintering the dielectric ceramic composition according to an embodiment of the present disclosure.

The dielectric layer 110 includes at least one variable valence acceptor element selected from the group consisting of Mn, V, Cr, Fe, Ni, Co, Cu, and Zn, at least one rare earth element selected from a group consisting of Y, Dy, Ho, Er, Gd, Ce, Nd, Sm, Tb, Tm, La, Gd, and Yb, and Si. Here, the dielectric layer 110 may include both Mn and V as a variable valence acceptor element, and Dy as a rare earth element. The dielectric layer 110 may further include a fixed valence acceptor such as Mg.

An amount (at %) of the rare earth element contained in the dielectric layer 110 may be greater than an amount (at %) of Mg contained in the dielectric layer 110. A ratio of the amount (at %) of the rare earth element contained in the dielectric layer 110 to the amount (at %) of the Mg contained in the dielectric layer 110 may be 15 or more. If the ratio is less than 15, the surface color condition of the body 100 may not be satisfied, and the MTTF of the highly accelerated life time test may be lowered to be less than 100 hours, thereby reducing reliability. The amount (at %) of the rare earth element contained in the dielectric layer 110 may be greater than a sum of the amount (at %) of Mg contained in the dielectric layer 110 and the amount (at %) of the variable valence acceptor element contained in the dielectric layer 110.

Meanwhile, the dielectric layer 110 includes the above-mentioned elements and the dielectric layer 110 includes the above-mentioned elements in the above-mentioned amount (at %), which may be confirmed by polishing an external electrode from a capacitor and removing the same, then pulverizing the body including the dielectric layer and the internal electrode layer to form a primary powder, removing a component of the internal electrode layer from the primary powder with a magnet to form a secondary powder, and performing Inductively Coupled Plasma-Mass Spectroscopy (ICP-MS) on the secondary powder.

A cover layer 130 may be disposed on the upper and lower portions of the body 100, that is, both end portions of the body 100 in a thickness direction (Z direction). The cover layer 130 may serve to maintain reliability of the capacitor component against external impacts. The cover layer 110 may be formed using a material for forming the dielectric layer 110.

The internal electrode layers 121 and 122 may be alternately disposed with the dielectric layer 110, and may include first and second internal electrode layers 121 and 122. The first and second internal electrode layers 121 and 122 may be alternately disposed to face each other with the dielectric layer 110 interposed therebetween, and may be exposed to (or be in contact with, or extend from) the third and fourth surfaces 103 and 104 of the body 100, respectively.

The internal electrode layers 121 and 122 are alternately exposed to the third surface 103 and the fourth surface 104, which are both end surfaces of the body 100 in a longitudinal direction (X), respectively, and are connected to the first and second external electrodes 210 and 220. That is, the first internal electrode layer 121 is exposed to the third surface 103 of the body 100 to be connected to the first external electrode 210, and is not exposed to the fourth surface 104 of the body 100 to not be connected to the second external electrode 220. The second internal electrode layer 122 is exposed to the fourth surface 104 of the body 100 to be connected to the second external electrode 220, and is not exposed to the third surface 103 of the body 100 to not be connected to the first external electrode 210. Accordingly, the first internal electrode layer 121 is spaced apart from the fourth surface 104 of the body 100 by a predetermined distance, and the second internal electrode layer 122 is spaced apart from the third surface 103 of the body 100 by a predetermined distance. In this case, the internal electrode layers 121 and 122 may be electrically separated from each other by the dielectric layer 110 disposed in the middle.

For example, the internal electrode layers 121 and 122 may include one or more conductors of palladium (Pd), silver (Ag), nickel (Ni), and copper (Cu). For example, the internal electrode layers 121 and 122 may be BME-type including nickel (Ni).

The external electrodes 210 and 220 are disposed on the body 100 and are connected to the internal electrode layers 121 and 122. As illustrated in FIGS. 1 and 2, the external electrodes 210 and 220 may include first and second external electrodes 210 and 220 respectively disposed on the third and fourth surfaces 103 and 104 of the body 100 and respectively connected to the first and second internal electrodes 121 and 122.

The first and second external electrodes 210 and 220 may include first and second connection portions respectively disposed on the third and fourth surfaces 103 and 104 of the body 100 to be connected to the first and second internal electrode layers 121 and 122, and first and second extension portions extending from the first and second connection portions to the first surface 101 of the body 100, respectively.

The first and second extension portions are disposed to be spaced apart from each other on the first surface 101 of the body 100. Meanwhile, the first and second extension portions may extend not only to the first surface 101 of the body 100, but also to each of the second, fifth and sixth surfaces 102, 105, 106 of the body 100, but the scope of the present disclosure is not limited thereto. That is, as illustrated in FIG. 1, each of the external electrodes 210 and 220 of the present disclosure may be a normal type formed on five surfaces of the body 100, but is not limited thereto. It may be an L-type formed on two surfaces of the body 100, a C-type formed on three surfaces of the body 100, and the like.

The external electrodes 210 and 220 may be formed of any material as long as they have electrical conductivity, such as metal, and specific materials may be determined in consideration of electrical characteristics and structural stability, and further may have a multilayer structure. For example, each of the external electrodes 210 and 220 may include a first layer and a second layer, and the first layer may be formed by sintering a sintered conductive paste including a conductive metal and glass, or may be formed by curing a curable conductive paste including a conductive metal a base resin, or may be formed by vapor deposition. The second layer may be a nickel (Ni) plating layer and a tin (Sn) plating layer sequentially formed on the first layer by a plating method.

Meanwhile, in the present embodiment, a structure in which the capacitor component 100 has two external electrodes 210 and 220 is described, but the number and shape of the external electrodes 210 and 220 may be changed depending on the shape of the internal electrode layers 121 and 122 or other purposes.

Hereinafter, the present inventive concept will be described in more detail through Experimental examples, which are intended to help a specific understanding of the present inventive concept, and the scope of the present inventive concept is not limited by the Experimental examples.

EXPERIMENTAL EXAMPLE

A slurry was prepared by mixing ethanol, toluene, a dispersant, and the like with a composition specified in Tables 1 and 3. A green sheet for forming a dielectric layer having a thickness of 3.0 μm and a green sheet for forming a cover layer having a thickness of 10 μm were manufactured using the slurry and a sheet manufacturing machine prepared using this method. A conductive paste containing Ni powder is printed and laminated on a green sheet for forming a dielectric, and the pressed and cut green chips are sintered to remove a binder, and then sintered between 1150 and 1200° C. to evaluate a surface color, a dielectric constant, DF, TCC, RC, and the like, of the sintered chips, and a highly accelerated life time test (HALT) was performed.

As the base material main component, $BaTiO_3$ powder having an average particle size of 150 nm was used. Raw material powder containing the main component and the subcomponent was milled for 10 hours by using a zirconia ball as a mixing/dispersing medium, ethanol/toluene and a dispersant were mixed and milled for 10 hours, and a binder was mixed and then milled for an additional 10 hours.

A green sheet for forming a cover layer was laminated in 25 layers, and 21 green sheet layers for forming a dielectric layer printed with a conductive paste containing Ni were laminated, and the 21 printed green sheet layers were pressed and laminated to prepare a bar. The pressing bar was cut into green chips of a size of 3216 (length×width× thickness of about 3.2 mm×1.6 mm×1.6 mm) using a cutter.

After the prepared green chip is sintered, a sintering process was performed for 1 hour at 1100 to 1200° C. in a reducing atmosphere (atmosphere of 0.1% $H_2$/99.9% $N_2$ to atmosphere of $H_2O/H_2/N_2$), and then re-oxidation was performed for three hours in a nitrogen ($N_2$) atmosphere at 1000° C.

A conductive paste containing Cu powder was applied to the sintered chip and then sintered to complete an external electrode. Accordingly, a prototype capacitor component, having a dielectric thickness after sintering of approximately 2.0 μm and a size of 3.2 mm×1.6 mm, of which the number of dielectric layers was 20, was manufactured.

A surface color, a dielectric constant, DF, TCC, RC, or the like were evaluated for the prototype capacitor component completed as described above, and a highly accelerated life time test (HALT) was performed.

The surface color (R/G/B) of the prototype capacitor component was quantitatively measured by disposing the prototype capacitor component in a color cabinet using a standard light source and capturing an image with a spectrophotometer or digital camera, and using an online image color picker (https://pinetools.com/image-color-picker) website. For color measurement, as the standard light source, a standard light source D65 (fluorescent lamp standard F7) specified by the World Lighting Organization (CIE) or JIS is used. The geometrical conditions for irradiated light and received light conform to condition (a) or the condition (b) shown in FIG. 3A and FIG. 3B among the four conditions for the geometrical condition of the irradiated light and the received light of the reflective object, which are stipulated in JIS Z 8722. That is, as in the condition (a) shown in FIG. 3A, the light source L was such that the irradiated light formed an angle of 45±2° with normal to a surface of a sample, and the received light R was such that the reflected light formed an angle of 0±10° with normal to the surface of the sample. Alternatively, as in the condition (b) shown in FIG. 3B, the light source L was such that the irradiated light formed an angle of 0±10° with normal to the surface of the sample, and the received light R was such that the reflected light formed an angle of 45±2° with normal to the surface of the sample.

Capacitance at room temperature and a dielectric loss of the capacitor component samples were measured at 1 kHz and AC 0.5V/μm using an LCR meter. A dielectric constant of a sample of the capacitor component was calculated from the capacitance, the dielectric thickness of the sample of the capacitor component, an area of the internal electrode layer, and the number of stacked layers.

The insulation resistance at room temperature was measured after 60 seconds by taking 10 samples and applying DC 10V/μm.

The change in capacitance according to temperature was measured in a temperature range of −55° C. to 145° C.

In the highly accelerated life time test (HALT), for 40 specimens per each sample, a voltage corresponding to an electric field of 42 V/μm was applied at 150° C. to measure a time for failure to occur, and a mean time to failure (MTTF) was calculated.

Tables 1 and 3 below are composition tables of Experimental examples, and the content of the subcomponents described in the table means the number of mole of the subcomponents added per 100 mole of the base material main component. Tables 2 and 4 illustrate characteristics of samples of prototype capacitor components corresponding to the compositions specified in Tables 1 and 3.

In Experimental Examples 1-1 to 1-5 of Table 1, when a sum of valence variable elements (Mn, V) of the first subcomponent is 0.3 mole, a content of Ba and Ca of the third subcomponent is 1.8 mole, a content of $SiO_2$ of the fourth subcomponent is 1.25 mole, and a content of a valence fixed element (Mg) of the fifth subcomponent is 0 mole, with respect to 100 mole of the base material main component of $BaTiO_3$ having an average particle diameter of 150 nm, an Experimental example according to a change in a content of Dy of a second subcomponent rare earth element is shown. Experimental Examples 1-1 to 1-5 of Table 2 show characteristics of the corresponding Prototype capacitor component samples. All of these specimens showed a color, close to reduced black corresponding to a range below 30/30/40 with respect to R/G/B values.

When the content of Dy is an element ratio of 1.0 mole (Experimental Example 1-1), the dielectric constant is 4526, and the MTTF is 76 hours, which shows a low value of less than 100 hours. When the Dy content is 1.5 mole or more

TABLE 1

| EX. | First subcomponent $MnO_2$ | First subcomponent $V_2O_5$ | Second subcomponent $Dy_2O_3$ | Third subcomponent $BaCO_3$ | Third subcomponent $CaCO_3$ | Fourth sub-component $SiO_2$ | Fifth sub-component $MgCO_3$ | RE/Mg | (Ba + Ca)/ Si | Sintering atmosphere EMF (mV) (@850° C.) |
|---|---|---|---|---|---|---|---|---|---|---|
| 1-1 | 0.100 | 0.100 | 0.50 | 1.80 | 0.00 | 1.25 | 0.00 | ∞ | 1.44 | 720 |
| 1-2 | 0.100 | 0.100 | 0.75 | 1.80 | 0.00 | 1.25 | 0.00 | ∞ | 1.44 | 720 |
| 1-3 | 0.100 | 0.100 | 1.00 | 1.80 | 0.00 | 1.25 | 0.00 | ∞ | 1.44 | 720 |
| 1-4 | 0.100 | 0.100 | 2.00 | 1.80 | 0.00 | 1.25 | 0.00 | ∞ | 1.44 | 720 |
| 1-5 | 0.100 | 0.100 | 2.50 | 1.80 | 0.00 | 1.25 | 0.00 | ∞ | 1.44 | 720 |
| 2-1 | 0.100 | 0.100 | 1.00 | 1.80 | 0.00 | 1.25 | 0.10 | 20.00 | 1.44 | 720 |
| 2-2 | 0.100 | 0.100 | 1.00 | 1.80 | 0.00 | 1.25 | 0.13 | 15.04 | 1.44 | 720 |
| 2-3 | 0.100 | 0.100 | 1.00 | 1.80 | 0.00 | 1.25 | 0.20 | 10.00 | 1.44 | 720 |
| 2-4 | 0.100 | 0.100 | 2.00 | 1.80 | 0.00 | 1.25 | 0.20 | 20.00 | 1.44 | 720 |
| 2-5 | 0.100 | 0.100 | 2.00 | 1.80 | 0.00 | 1.25 | 0.27 | 15.04 | 1.44 | 720 |
| 2-6 | 0.100 | 0.100 | 2.00 | 1.80 | 0.00 | 1.25 | 0.30 | 13.33 | 1.44 | 720 |
| 3-1 | 0.025 | 0.025 | 1.00 | 1.80 | 0.00 | 1.25 | 0.00 | ∞ | 1.44 | 720 |
| 3-2 | 0.050 | 0.050 | 1.00 | 1.80 | 0.00 | 1.25 | 0.00 | ∞ | 1.44 | 720 |
| 3-3 | 0.200 | 0.200 | 1.00 | 1.80 | 0.00 | 1.25 | 0.00 | ∞ | 1.44 | 720 |
| 3-4 | 0.340 | 0.340 | 1.00 | 1.80 | 0.00 | 1.25 | 0.00 | ∞ | 1.44 | 720 |
| 3-5 | 0.500 | 0.500 | 1.00 | 1.80 | 0.00 | 1.25 | 0.00 | ∞ | 1.44 | 720 |
| 1-3-2 | 0.100 | 0.100 | 1.00 | 1.80 | 0.00 | 1.25 | 0.00 | ∞ | 1.44 | 680 |
| 1-3-3 | 0.100 | 0.100 | 1.00 | 1.80 | 0.00 | 1.25 | 0.00 | ∞ | 1.44 | 860 |

TABLE 2

| EX. | Characteristics of Prototype capacitor component SPL color R/G/B | Dielectric constant | DF(%) | TCC (%) (−55° C.) | TCC (%) (125° C.) | RC (ΩF) | MTTF (h) 150° C. 42 V/um | Determine characteristics ○: Good X: Bad |
|---|---|---|---|---|---|---|---|---|
| 1-1 | 26/8/11 | 4526 | 8.84 | −14.5 | −24.7 | 834 | 76 | X |
| 1-2 | 19/8/12 | 2850 | 5.42 | −13.8 | −16.8 | 2335 | 128 | ○ |
| 1-3 | 8/7/11 | 2756 | 5.63 | −13.9 | −18.2 | 2568 | 156 | ○ |
| 1-4 | 11/12/10 | 2245 | 3.83 | −16.7 | −20.5 | 3126 | 133 | ○ |
| 1-5 | 15/9/14 | 1823 | 3.12 | −17.3 | −23.5 | 3354 | 57 | X |
| 2-1 | 23/12/12 | 2812 | 5.71 | −13.5 | −18.5 | 2563 | 139 | ○ |
| 2-2 | 27/12/12 | 2834 | 5.88 | −14.2 | −18.6 | 2459 | 112 | ○ |
| 2-3 | 38/11/10 | 2793 | 5.37 | −14.5 | −19.8 | 2758 | 56 | X |
| 2-4 | 12/7/11 | 2313 | 3.58 | −15.7 | −20.6 | 2653 | 121 | ○ |
| 2-5 | 17/12/10 | 2302 | 3.47 | −16.5 | −20.7 | 2274 | 105 | ○ |
| 2-6 | 42/11/10 | 2295 | 3.35 | −16.7 | −20.8 | 2636 | 77 | X |
| 3-1 | 5/6/38 | 5836 | 11.20 | −13.5 | −25.6 | 356 | 34 | X |
| 3-2 | 12/15/37 | 3025 | 4.44 | −13.7 | −13.2 | 1568 | 114 | ○ |
| 3-3 | 11/12/25 | 2531 | 3.17 | −13.3 | −12.5 | 2567 | 168 | ○ |
| 3-4 | 24/20/25 | 2234 | 2.88 | −13.5 | −12.8 | 1238 | 123 | ○ |
| 3-5 | 34/22/23 | 2156 | 2.54 | −14.7 | −11.6 | 845 | 75 | X |
| 1-3-2 | 56/40/40 | 2756 | 5.63 | −13.9 | −18.2 | 2568 | 51 | X |
| 1-3-3 | 7/7/12 | 3025 | 6.68 | −18.8 | −19.5 | 3125 | 124 | ○ | and 4.0 mole or less in an element ratio (Experimental Examples 1-2 to 1-4), it can be confirmed that a target characteristic of the present disclosure is realized, in the target characteristic, the specimens have a reduced color corresponding to the range of 30/30/40 or less with respect to R/G/B, the X7S standard in which the dielectric constant falls within a range of 2000 or more and 4000 or less and TCC falls within a range of ±22% is satisfied, and MTTF is implemented for 100 hours or more is realized. When the Dy content was further increased to 5.0 mole in an element ratio (Experimental Example 1-5), the dielectric constant was lowered to less than 2000 and the MTTF also had a low value of less than 100 hours. Summarizing the above results, when the content of the rare earth element of the second subcomponent is 1.5 mole or more and 4.0 mole or less with respect to 100 mole of the base material main component, the color of the specimen falls within a range of 30/30/40 or less in terms of R/G/B values, the dielectric constant falls within a range of 2000 or more and 4000 or less, and it can be seen that good high-temperature reliability of MTTF 100 hours or more is realized, while TCC satisfies the X7S characteristic.

Experimental examples 2-1 to 2-6 of Table 1 shows an experimental example according to a content ratio of the second subcomponent rare earth element Dy and the fifth subcomponent Mg is shown, when a sum of the valence variable elements Mn and V of the first subcomponent is 0.3 mole, the content of the third subcomponent Ba or Ca is 1.8 mole, and the content of the fourth subcomponent $SiO_2$ is 1.25 mole, with respect to 100 mole of the base material main component of $BaTiO_3$ having an average particle diameter of 150 nm. Experimental examples 2-1 to 2-6 of Table 2 show the characteristics of the corresponding prototype capacitor component samples. In the present disclosure, the addition of the fifth subcomponent Mg had an effect of lowering a sintering temperature and widening a sintering window. When a content ratio RE(Dy)/Mg of the rare earth element Dy and the fifth subcomponent Mg is 15 or more, the target characteristics of the present disclosure are realized (Experimental examples 2-1, 2-2, 2-4, and 2-5), and when it is less than 15, it can be confirmed that characteristic deterioration occurs (Experimental examples 2-3 and 2-6), in the characteristic deterioration, the color of the specimen becomes similar to that of a typical MLCC specimen close to brown, outside of the range of 30/30/40 or less with respect to R/G/B values, and the MTTF is less than 100 hours. Therefore, in order to realize the target characteristics of the present disclosure by allowing the color of the specimen to fall within the range of 30/30/40 or less with respect to R/G/B values, the content ratio RE(Dy)/Mg of the rare earth element Dy and the second subcomponent Mg should be 15 or more.

Experimental Examples 3-1 to 3-5 of Table 1 illustrate an experimental example according to a sum of contents of the first subcomponent valence variable elements Mn and V, when a content of the second subcomponent rare earth element Dy was 2.0 mole, a content of the third subcomponent Ba or Ca was 1.8 mole, and a content of the fourth subcomponent $SiO_2$ is 1.25 mole, with respect to 100 mole of the base material main component of $BaTiO_3$. Experimental Examples 3-1 to 3-5 of Table 2 show characteristics of the prototype capacitor component samples corresponding thereto. When the sum of the content of the variable valence element is less than 0.15 mole (Experimental Example 3-1), a dielectric constant exceeds 4000, and MTTF is lowered to less than 100 hours. On the other hand, when the sum of the content of the valence variable elements exceeds 1.02 mole, it can be seen that the color of the specimen is outside of the range of 30/30/40 or less with respect to R/G/B values, and characteristics are deteriorated, of which MTTF is less than 100 hours. Therefore, in order to realize the target characteristics of the present disclosure by distributing the color of the specimen in the range of less than 30/30/40 with respect to R/G/B values and the dielectric constant in the range of 2000 or more and 4000 or less, the sum of the first subcomponent valence variable elements Mn and V must be in the range of 0.15 mole or more and 1.02 mole or less with respect to 100 mole of the base material main component (Experimental Examples 3-2 to 3-5).

Each of Experimental Examples 1-3-2 and 1-3-3 of Table 1 shows an experimental example in which a reduction degree of a sintering atmosphere was different for Experimental Example 1-3, and each of Experimental Examples 1-3-2 and 1-3-3 of Table 2 shows characteristics of the prototype capacitor component samples corresponding thereto. The degree of reduction in the sintering atmosphere was relatively compared by measuring electromotive force (EMF) of a flow of gas in a kiln at 850° C. using a zirconia (ZrO—) oxygen sensor. Even with the same composition, when a concentration of hydrogen is low as 0.1% and sintering is performed in a sintering atmosphere corresponding to a low value of 680 mV, the color of the specimen is outside of the range of 30/30/40 or less with respect to R/G/B values, a value of MTTF is lowered to less than 100 hours (Experimental Example 1-3-2). On the other hand, under the condition of values of EMF values of 720 mV and 860 mV, corresponding to the concentration of hydrogen of 0.3% and 3.0% in the sintering atmosphere, it could be confirmed that target characteristics of the present disclosure are implemented, in the target characteristics, the color of the specimen falls within the range of 30/30/40 with respect to R/G/B values, the dielectric constant falls within the range of 2000 or more and 4000, and 100 hours or more of MTTF are implemented (Experimental Examples 1-3 and 1-3-3). Therefore, in order to implement the target characteristics of the present disclosure, the sintering must be performed under the condition that the EMF value of the sintering atmosphere is 720 mV or more.

TABLE 3

| EX. | First subcomponent | | Second subcomponent | Third subcomponent | | Fourth subcomponent | Fifth subcomponent | RE/Mg | (Ba + Ca)/Si | Sintering atmosphere EMF (mV) (@850° C.) |
|---|---|---|---|---|---|---|---|---|---|---|
| | $MnO_2$ | $V_2O_5$ | $Dy_2O_3$ | $BaCO_3$ | $CaCO_3$ | $SiO_2$ | $MgCO_3$ | | | |
| 4-1 | 0.100 | 0.100 | 1.00 | 0.90 | 0.90 | 1.25 | 0.00 | ∞ | 1.44 | 720 |
| 4-2 | 0.100 | 0.100 | 1.00 | 1.40 | 0.00 | 1.25 | 0.00 | ∞ | 1.12 | 720 |
| 4-3 | 0.100 | 0.100 | 1.00 | 1.50 | 0.00 | 1.25 | 0.00 | ∞ | 1.20 | 720 |
| 4-4 | 0.100 | 0.100 | 1.00 | 2.50 | 0.00 | 1.25 | 0.00 | ∞ | 2.00 | 720 |
| 4-5 | 0.100 | 0.100 | 1.00 | 3.00 | 0.00 | 1.25 | 0.00 | ∞ | 2.40 | 720 |

TABLE 3-continued

| EX. | First subcomponent MnO$_2$ | Second subcomponent V$_2$O$_5$ | Third subcomponent Dy$_2$O$_3$ | Fourth subcomponent BaCO$_3$ | Fourth subcomponent CaCO$_3$ | Fifth subcomponent SiO$_2$ | Fifth subcomponent MgCO$_3$ | RE/Mg | (Ba + Ca)/Si | Sintering atmosphere EMF (mV) (@850° C.) |
|---|---|---|---|---|---|---|---|---|---|---|
| 5-1 | 0.100 | 0.100 | 1.00 | 0.43 | 0.00 | 0.30 | 0.00 | ∞ | 1.44 | 720 |
| 5-2 | 0.100 | 0.100 | 1.00 | 0.72 | 0.00 | 0.50 | 0.00 | ∞ | 1.44 | 720 |
| 5-3 | 0.100 | 0.100 | 1.00 | 2.88 | 0.00 | 2.00 | 0.00 | ∞ | 1.44 | 720 |
| 5-4 | 0.100 | 0.100 | 1.00 | 4.32 | 0.00 | 3.00 | 0.00 | ∞ | 1.44 | 720 |
| 5-5 | 0.100 | 0.100 | 1.00 | 5.76 | 0.00 | 4.00 | 0.00 | ∞ | 1.44 | 720 |

TABLE 4

| EX. | SPL⊜ R/G/B | Dielectric constant | DF(%) | TCC (%) (−55° C.) | TCC (%) (125° C.) | RC (ΩF) | MTTF (h) 150° C. 42 V/um | Determine characteristics ○: Good X: Bad |
|---|---|---|---|---|---|---|---|---|
| 4-1 | 8/8/10 | 2437 | 5.32 | −13.5 | −17.8 | 2456 | 162 | ○ |
| 4-2 | 7/8/10 | 4785 | 9.23 | −26.8 | −23.5 | 956 | 75 | X |
| 4-3 | 10/12/13 | 3325 | 7.46 | −19.8 | −20.5 | 2237 | 135 | ○ |
| 4-4 | 25/13/15 | 2264 | 3.03 | −15.5 | −16.3 | 2874 | 116 | ○ |
| 4-5 | 168/132/132 | 1563 | 1.98 | −14.2 | −15.4 | 1574 | 42 | X |
| 5-1 | 143/123/121 | 1125 | 1.12 | — | — | 23 | — | X |
| 5-2 | 27/23/23 | 2356 | 4.63 | −13.9 | −18.2 | 2568 | 156 | ○ |
| 5-3 | 12/10/13 | 2597 | 5.51 | −13.5 | −17.4 | 2477 | 148 | ○ |
| 5-4 | 15/12/12 | 2113 | 5.68 | −14.1 | −19.2 | 2347 | 106 | ○ |
| 5-5 | 11/13/15 | 2034 | 5.81 | −14.6 | −19.3 | 2654 | 62 | X |

Experimental Examples 4-1 to 4-5 of Table 3 show an experimental example according to a change in the sum of the content of third subcomponent Ba or Ca and a change in the content ratio (Ba+Ca)/Si of the third subcomponent and the fourth subcomponent accordingly, when a sum of the valence variable elements Mn and V of the first subcomponent is 0.3 mole, a content of the second subcomponent rare earth element Dy is 2.0 mole, and a content of fourth subcomponent SiO$_2$ is 1.25 mole, with respect to 100 mole of the BaTiO$_3$ base material main component having an average particle diameter of 150 nm. Examples 4-1 to 4-5 of Table 4 show characteristics of the Prototype capacitor component samples corresponding thereto. When the the ratio of Ba+Ca/Si is 1.12 (Experimental Example 4-2), the color of the specimen falls within the range of 30/30/40 or less with respect to R/G/B values, but the dielectric constant exceeds 4000, and the MTTF may be deteriorated to be less than 100 hours. In addition, when the (Ba+Ca)/Si ratio is 2.4 (Example 4-5), as density of the specimen is low, the color is outside of the range of 30/30/40 or less with respect to R/G/B values and the dielectric constant is lowered to be less than 2000, and MTTF deteriorates to less than 100 hours. Therefore, it can be confirmed that the target characteristic of the present disclosure is realized when the (Ba+Ca)/Si ratio falls within the range of 1.2 or more and 2.0 or less (Experimental Examples 4-1, 4-3, and 4-4).

Experimental Examples 5-1 to 5-5 of Table 3 show an experimental example according to a change in a content of the fourth subcomponent SiO$_2$, under the condition that the sum of the content of the third subcomponent Ba or Ca and the ratio of the content of the fourth subcomponent Si ((Ba+Ca)/Si) are fixed to 1.44. Experimental Examples 5-1 to 5-5 of Table 4 show characteristics of the prototype capacitor component samples corresponding thereto. When the content of SiO$_2$ is as low as 0.3 mole (Experimental Example 5-1), density of the specimen is low and the color is outside of the range of 30/30/40 or less with respect to R/G/B values, and the dielectric constant is less than 2000, and deterioration of characteristics, in which MTTF is less than 100 hours, occurs. On the other hand, when the content of SiO$_2$ is very high as 4.0 mole (Experimental example 5-5), the color of the specimen falls within a range of 30/30/40 or less with respect to R/G/B values, but the dielectric constant is lowered to less than 2000, and the MTTF deteriorates to less than 100 hours. Therefore, when considering Experimental Examples 4-1 to 4-5 and Experimental Examples 5-1 to 5-5, it can be confirmed that the target characteristics of the present disclosure are realized when the ratio of (Ba+Ca)/Si satisfies a range of 1.2 or more and 2.0 or less, and the Si content satisfies a range of 0.5 or more 3.0 mole or less.

As set forth above, according to an aspect of the present disclosure, even when a dielectric ceramic composition and a capacitor component are sintered under reducing atmosphere conditions, X7R or X7S temperature characteristics may be satisfied.

According to an aspect of the present disclosure, even when a dielectric ceramic composition and a capacitor component are sintered under reducing atmosphere conditions, reliability may be improved.

However, various and advantageous advantages and effects of the present disclosure are not limited to the above description, and will be more readily understood in the process of describing specific embodiments of the present disclosure.

While this disclosure includes specific examples, it will be apparent to one of ordinary skill in the art that various changes in form and details may be made in these examples without departing from the spirit and scope of the claims and their equivalents.

What is claimed is:

1. A capacitor component, comprising:
a body including a dielectric layer and an internal electrode layer; and
an external electrode disposed on the body, and connected to the internal electrode layer,
wherein a surface color of the body is R≤30, G≤30, B≤40 based on R/G/B,
wherein a dielectric constant of the dielectric layer is 2000 or more and 4000 or less.

2. The capacitor component of claim 1, wherein the dielectric layer comprises:
at least one variable valence acceptor element selected from a group consisting of Mn, V, Cr, Fe, Ni, Co, Cu, and Zn;
at least one rare earth element selected from a group consisting of Y, Dy, Ho, Er, Gd, Ce, Nd, Sm, Tb, Tm, La, Gd, and Yb; and
Si.

3. The capacitor component of claim 2, wherein the variable valence acceptor element of the dielectric layer comprises Mn and V, respectively.

4. The capacitor component of claim 3, wherein the dielectric layer further comprises Mg.

5. The capacitor component of claim 4, wherein a total amount (at %) of rare earth elements contained in the dielectric layer is greater than an amount (at %) of Mg contained in the dielectric layer.

6. The capacitor component of claim 5, wherein a ratio of the total amount (at %) of rare earth elements contained in the dielectric layer to the amount (at %) of Mg contained in the dielectric layer is 15 or more.

7. The capacitor component of claim 4, wherein an amount (at %) of a rare earth element contained in the dielectric layer is greater than a sum of an amount (at %) of Mg contained in the dielectric layer and an amount (at %) of variable valence acceptor elements contained in the dielectric layer.

8. The capacitor component of claim 3, wherein a rare earth element of the dielectric layer comprises Dy.

9. A dielectric ceramic composition, comprising:
a barium titanate-based base material main component and a subcomponent,
wherein the subcomponent comprises a first subcomponent including at least one of oxides and carbonates of variable valence acceptor elements including at least one of Mn, V, Cr, Fe, Ni, Co, Cu, and Zn; a second subcomponent including at least one of oxides and carbonates of rare earth elements including at least one of Y, Dy, Ho, Er, Gd, Ce, Nd, Sm, Tb, Tm, La, Gd and Yb; a third subcomponent including at least one selected from a group consisting of oxides and carbonates of at least one of Ba and Ca; a fourth subcomponent including at least one selected from a group consisting of oxides and carbonates of Si; and a fifth subcomponent including at least one selected from a group consisting of oxides and carbonates of Mg,
wherein the first subcomponent includes Mn and V, and is contained so that a sum of variable valence acceptor elements of the first subcomponent per 100 mole of the base material main component is 0.15 mole or more and 1.02 mole or less,
wherein the second subcomponent includes Dy, and is contained so that a sum of the rare earth elements of the second subcomponent per 100 mole of the main component of the base material is 1.5 mole or more and 4.0 mole or less,
wherein the third subcomponent is contained so that a sum of Ba and Ca of the third subcomponent per 100 mole of the base material main component is 0.72 mole or more and 4.32 mole or less,
wherein the fourth subcomponent is contained so that a Si content of the fourth subcomponent is 0.5 mole or more and 3.0 mole or less per 100 mole of the base material main component,
wherein the fifth subcomponent is contained so that Mg of the fifth subcomponent is 0.27 mole or less per 100 mole of the base material main component,
wherein a ratio of a total content of the rare earth elements of the second subcomponent to the Mg content of the fifth subcomponent is 15 or more.

10. The dielectric ceramic composition of claim 9, wherein a ratio of a total content of Ba and Ca of the third subcomponent to the Si content of the fourth subcomponent is 1.20 or more and 2.00 or less.

11. The dielectric ceramic composition of claim 9, wherein the first subcomponent includes $MnO_2$ and $V_2O_5$.

12. The dielectric ceramic composition of claim 9, wherein the second subcomponent includes $Dy_2O_3$.

13. The dielectric ceramic composition of claim 9, wherein the first subcomponent includes 0.05 mole or more and 0.34 mole or less of Mn per 100 mole of the base material main component, and 0.1 mole or more and 0.68 mole or less of V per 100 mole of the base material main component.

14. A dielectric ceramic composition, comprising:
a barium titanate-based base material main component and a subcomponent,
wherein the subcomponent comprises a first subcomponent including at least one of oxides and carbonates of variable valence acceptor elements including at least one of Mn and V; a second subcomponent including at least one of oxides and carbonates of Dy; a third subcomponent including at least one selected from a group consisting of oxides and carbonates of at least one of Ba and Ca; and a fourth subcomponent including at least one selected from a group consisting of oxides and carbonates of Si,
wherein a sum of Mn and V is 0.15 mole or more and 1.02 mole or less per 100 mole of the base material main component,
wherein Dy is 1.5 mole or more and 4.0 mole or less per 100 mole of the main component of the base material,
wherein a sum of Ba and Ca is 0.72 mole or more and 4.32 mole or less per 100 mole of the base material main component,
wherein Si is 0.5 mole or more and 3.0 mole or less per 100 mole of the base material main component,
wherein a ratio of a total content of Ba and Ca to Si content is 1.20 or more and 2.00 or less.

15. The dielectric ceramic composition of claim 14, wherein the first subcomponent includes $MnO_2$ and $V_2O_5$.

16. The dielectric ceramic composition of claim 14, wherein the second subcomponent includes $Dy_2O_3$.

17. The dielectric ceramic composition of claim 14, wherein the first subcomponent includes 0.05 mole or more and 0.34 mole or less of Mn per 100 mole of the base material main component, and 0.1 mole or more and 0.68 mole or less of V per 100 mole of the base material main component.

18. The dielectric ceramic composition of claim 14, wherein the subcomponent further comprises a fifth subcomponent including at least one selected from a group consisting of oxides and carbonates of Mg, and the fifth subcomponent is contained so that Mg of the fifth subcomponent is 0.27 mole or less per 100 mole of the base material main component.

19. The dielectric ceramic composition of claim 18, wherein a ratio of a total content of rare earth elements of the second subcomponent to the Mg content of the fifth subcomponent is 15 or more.

20. The dielectric ceramic composition of claim 14, wherein the subcomponent does not contain an oxide of Mg and a carbonate of Mg.

* * * * *